(12) United States Patent
Sakano et al.

(10) Patent No.: US 7,846,589 B2
(45) Date of Patent: Dec. 7, 2010

(54) FUEL CELL HAVING SEPARATOR WITH CELL VOLTAGE TERMINAL

(75) Inventors: Masaaki Sakano, Utsunomiya (JP); Masaru Oda, Utsunomiya (JP); Kentaro Nagoshi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 552 days.

(21) Appl. No.: 11/258,554

(22) Filed: Oct. 25, 2005

(65) Prior Publication Data

US 2006/0088740 A1 Apr. 27, 2006

(30) Foreign Application Priority Data

Oct. 25, 2004 (JP) ............................ 2004-309897

(51) Int. Cl.
H01M 8/00 (2006.01)
H01M 8/04 (2006.01)
H01M 8/24 (2006.01)
(52) U.S. Cl. ................... 429/400; 429/432; 429/452
(58) Field of Classification Search .................. 429/12, 429/26, 34
See application file for complete search history.

(56) References Cited

U.S. PATENT DOCUMENTS 6,348,280 B1 2/2002 Maeda et al.
6,455,179 B1 * 9/2002 Sugita et al. .................. 429/12
2003/0003345 A1 * 1/2003 Ohara et al. .................. 429/38

FOREIGN PATENT DOCUMENTS

| JP | 2000-195529 | 7/2000 |
| JP | 2002-367649 | 12/2002 |
| JP | 2002358993 A | * 12/2002 |
| JP | 2004-079192 | 3/2004 |

OTHER PUBLICATIONS

Japanese Office Action for Application No. 2004-309897, dated Jun. 2, 2009.

* cited by examiner

*Primary Examiner*—Patrick Ryan
*Assistant Examiner*—Karie O'Neill Apicella
(74) *Attorney, Agent, or Firm*—Lahive & Cockfield, LLP; Anthony A. Laurentano (57) ABSTRACT

A fuel cell stack includes unit cells. At one side of the unit cells, an oxygen-containing gas supply passage and a fuel gas discharge passage having different opening areas are provided. At the one side of the unit cells, a recess is provided near the fuel gas discharge passage having a relatively small opening area. A cell voltage terminal is provided in the recess such that the cell voltage terminal does not protrude outwardly from the side of the unit cells.

5 Claims, 7 Drawing Sheets

FUEL CELL HAVING SEPARATOR WITH CELL VOLTAGE TERMINAL

BACKGROUND OF THE INVENTION

1. Field of the Invention

The present invention relates to a fuel cell including electrolyte electrode assemblies and separators stacked alternately in a stacking direction. Each of the electrolyte electrode assemblies includes a pair of electrodes and an electrolyte interposed between the electrodes. Fluid passages extend through the fuel cell in the stacking direction such that fluids including at least one of a coolant and reactant gases flow through the fluid passages.

2. Description of the Related Art

For example, a solid polymer electrolyte fuel cell employs a membrane electrode assembly (MEA) which includes two electrodes (anode and cathode), and an electrolyte membrane (electrolyte) interposed between the electrodes. The electrolyte membrane is a polymer ion exchange membrane. The membrane electrode assembly is interposed between a pair of separators. The membrane electrode assembly and the separators make up a unit cell for generating electricity. In use, a plurality of unit cells are stacked together to form a fuel cell.

In the unit cell, a fuel gas such as a gas chiefly containing hydrogen (hereinafter also referred to as the "hydrogen-containing gas") is supplied to the anode. A gas chiefly containing oxygen or the air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In the fuel cell, it is necessary to detect whether each of the unit cells has the desired power generation performance. Therefore, in general, cell voltage terminals provided at the separators are connected to a voltage detection apparatus for detecting the cell voltage of each unit cell or the cell voltage of each predetermined number of unit cells.

For example, according to the disclosure of Japanese Laid-Open Patent Publication No. 2004-79192, a plurality of cell voltage monitors are attached to a fuel cell. Each of the cell voltage monitors includes one housing fixed to the fuel cell, and one or more terminals supported by the housing. The one or more terminals of each of the cell voltage monitors are arranged in parallel to each other in the housing of the cell voltage monitor, and arranged in a row in the stacking direction of the cells of the fuel cell. The housings for the respective cell voltage monitors are arranged in a zigzag pattern on the side surface of the fuel cell.

An internal manifold type fuel cell is one type of the fuel cell. Reactant gas passages (oxygen-containing gas passages and/or fuel gas passages) extend through the internal manifold type fuel cell in the stacking direction. The reactant gas passages are connected to the inlets and the outlets of reactant gas flow fields (oxygen-containing gas flow field and/or fuel gas flow field).

Figure 7:
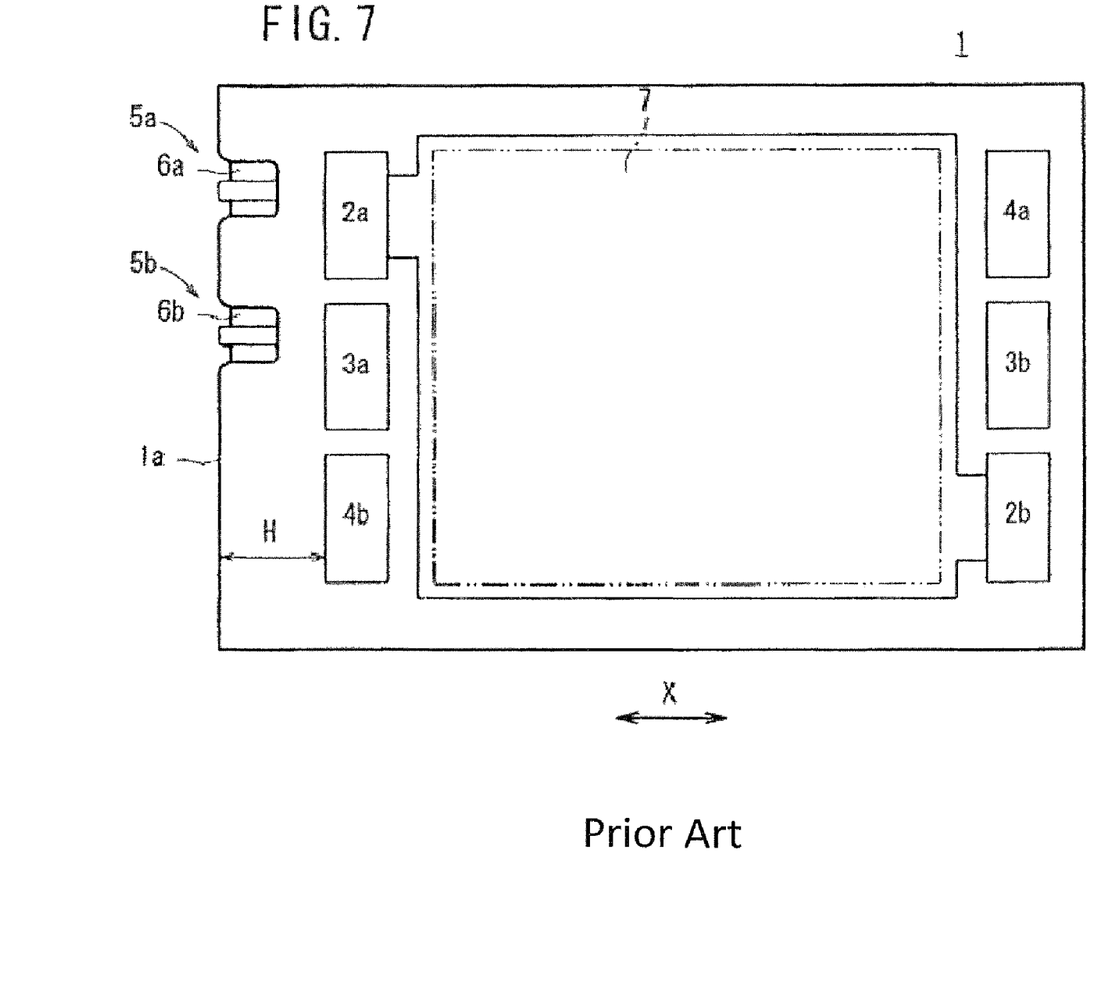
FIG. 7 is a front view showing a conventional separator.

Therefore, if the conventional technique is applied to the internal manifold type fuel cell, for example, a separator 1 as shown in FIG. 7 is used. At one end of the separator 1 in a direction indicated by an arrow X, an oxygen-containing gas supply passage 2a, a coolant supply passage 3a, and a fuel gas discharge passage 4b are provided, and at the other end of the separator 1 in the direction indicated by the arrow X, a fuel gas supply passage 4a, a coolant discharge passage 3b, and an oxygen-containing gas discharge passage 2b are provided.

Cell terminals 5a, 5b are provided on an end surface 1a at the one end of the separator 1 in the direction indicated by the arrow X. Grooves are formed in resin members of the cell terminals 5a, 5b for exposing metal portions 6a, 6b. Terminals of a cell voltage monitor (not shown) contact the metal portions 6a, 6b.

However, in the separator 1, in order to provide the cell terminals 5a, 5b, the distance H from the end surface 1a of the separator 1 to the oxygen-containing gas supply passage 2a needs to be relatively large. Thus, the surface area of the electrode 7 cannot be large. In order to achieve the desired electrode surface area, the size of the separator 1 needs to be significantly large in the direction indicated by the arrow X.

Further, in order to efficiently achieve the sufficient surface area in the surface of the separator 1, the distance from the end surface 1a to the end surface of the electrode 7 needs to be reduced. Therefore, the opening area of the oxygen-containing gas supply passage 2a is reduced, and the pressure loss in the oxygen-containing gas supply passage 2a is increased.

SUMMARY OF THE INVENTION

A main object of the present invention is to provide a fuel cell in which it is possible to provide a cell voltage terminal, and to achieve reduction in the overall size of the fuel cell and the desired power generation performance of the fuel cell.

The present invention relates to a fuel cell comprising electrolyte electrode assemblies and separators stacked alternately in a stacking direction. Each of the electrolyte electrode assemblies includes a pair of electrodes, and an electrolyte interposed between the electrodes. Fluid passages extend through the fuel cell in the stacking direction such that fluids including at least one of a coolant and reactant gases flow through the fluid passages.

At least two of the fluid passages having different opening areas extend through at least one side of the separators. A recess is formed near the fluid passage having a small opening area among the at least two fluid passages, and a cell voltage terminal is provided in the recess.

Preferably, the fluid passage having the small opening area is a fuel gas discharge passage. It is because, for example, among an oxygen-containing gas supply passage, an oxygen-containing gas discharge passage, a fuel gas supply passage, and the fuel gas discharge passage as the fluid passages, the opening area of the fuel gas discharge passage is the smallest.

In the present invention, the recess is provided at least on one side of the separator, and the cell voltage terminal is accommodated in the recess. Therefore, the cell voltage terminal does not protrude outwardly from the separator. Thus, the overall size of the fuel cell is reduced effectively.

Further, the recess is provided near the fluid passage having the small opening area among the at least two fluid passages. Therefore, the space for the recess is available. Thus, it is possible to maintain the desired electrode surface area, and to reduce the pressure loss in the oxygen-containing gas supply passage. Accordingly, the power generation can be carried out efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
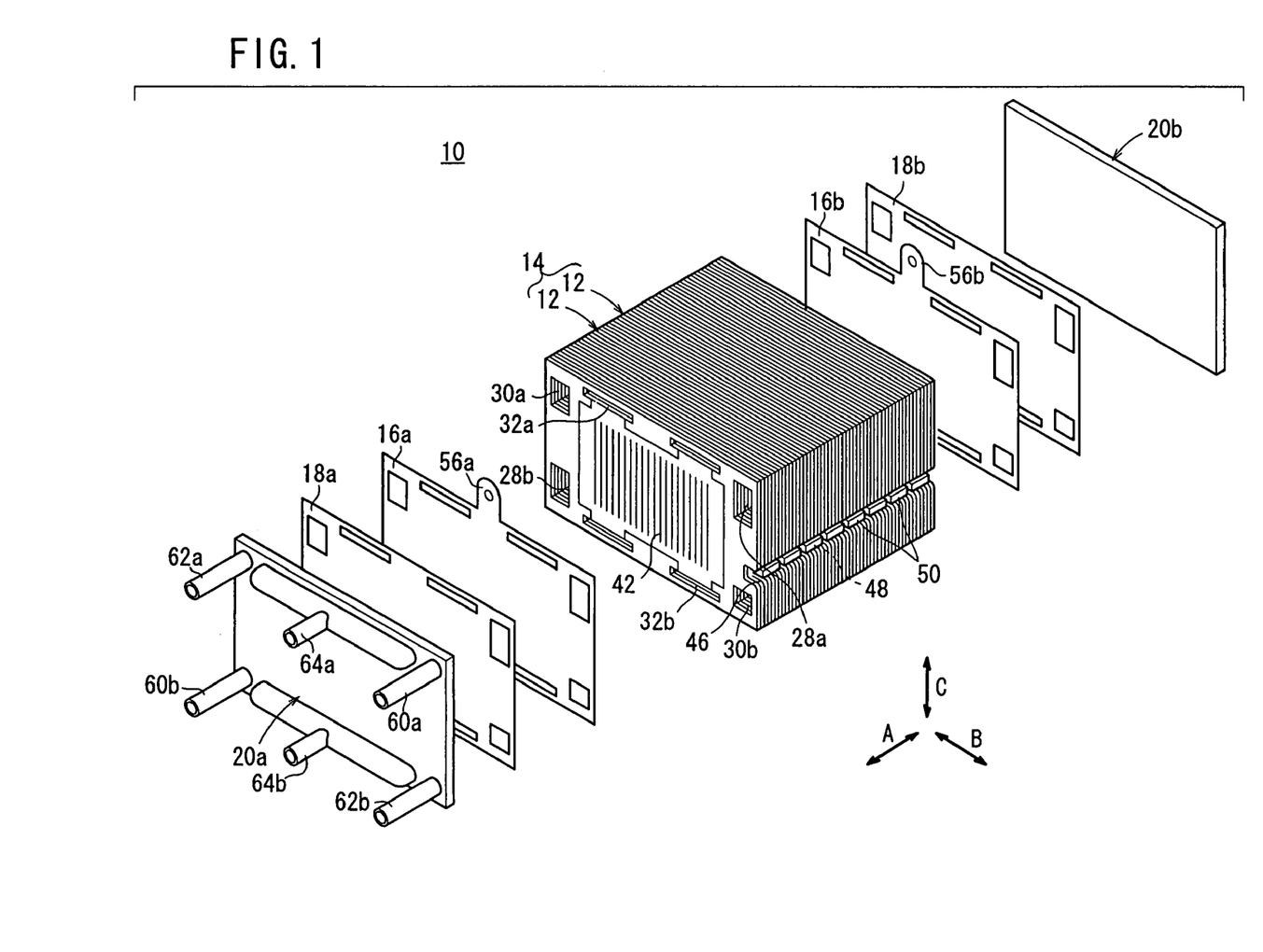
FIG. 1 is a partial exploded perspective view showing a fuel cell according to a first embodiment of the present invention.
Figure 2:
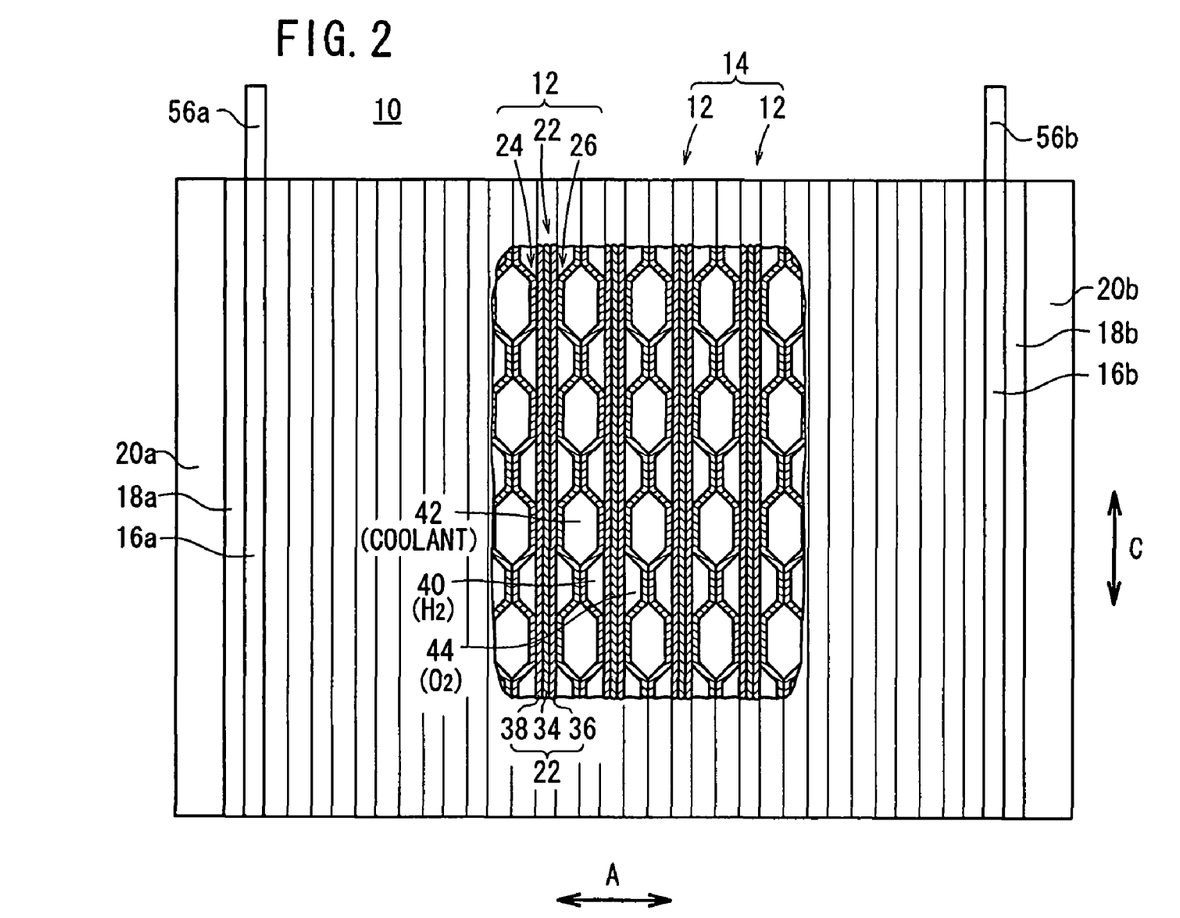
FIG. 2 is a side view partially in cross section showing the fuel cell.

FIG. 1 is a partial exploded perspective view showing a fuel cell according to a first embodiment of the present invention. FIG. 2 is a side view partially in cross section, showing the fuel cell.

As shown in FIG. 1, the fuel cell stack 10 includes a stack body 14 formed by stacking a plurality of unit cells 12 in a horizontal direction indicated by an arrow A. At one end of the stack body 14 in the stacking direction indicated by the arrow A, a terminal plate 16a is provided. An insulating plate 18a is provided outside the terminal plate 16a. Further, an end plate 20a is provided outside the insulating plate 18a. At the other end of the stack body 14 in the stacking direction, a terminal plate 16b is provided. An insulating plate 18b is provided outside the terminal plate 16b. Further, an end plate 20b is provided outside the insulating plate 18b.

For example, the fuel cell stack 10 is housed in a casing (not shown) having the end plates 20a, 20b. Alternatively, components of the fuel cell stack 10 between the end plates 20a, 20b may be tightened together by tie rods (not shown).

Figure 3:
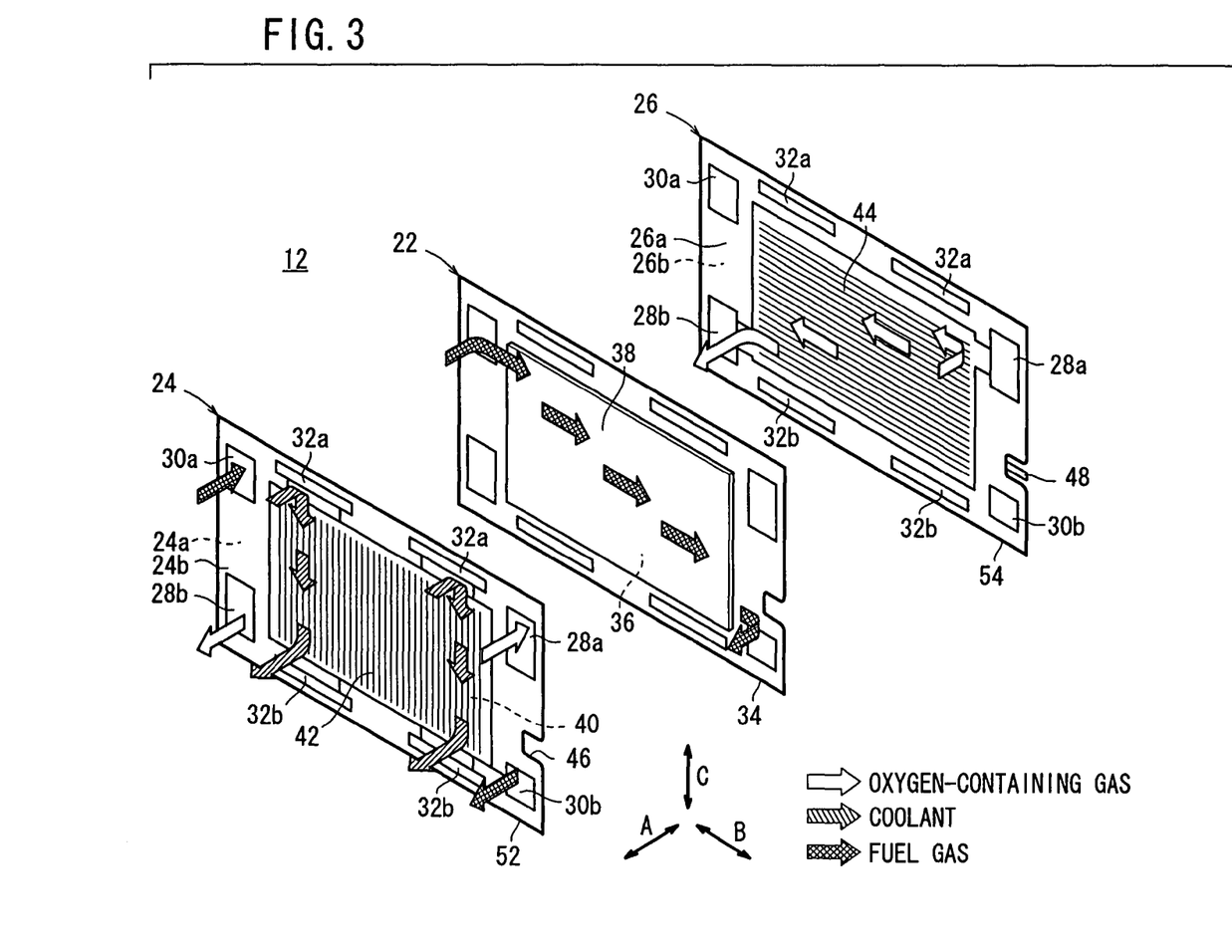
FIG. 3 is an exploded perspective view showing a unit cell of the fuel cell.

As shown in FIGS. 2 and 3, each of the unit cells 12 includes a membrane electrode assembly (electrolyte electrode assembly) 22 and first and second metal separators 24, 26 sandwiching the membrane electrode assembly 22. The first and second metal separators 24, 26 are thin corrugated plates. Instead of using the first and second metal separators 24, 26, for example, carbon separators may be used.

At one end of the unit cell 12 in a longitudinal direction indicated by an arrow B in FIG. 3, an oxygen-containing gas supply passage 28a for supplying an oxygen-containing gas, and a fuel gas discharge passage 30b for discharging a fuel gas such as a hydrogen-containing gas are provided. The oxygen-containing gas supply passage 28a and the fuel gas discharge passage 30b extend through the unit cell 12 in the direction indicated by the arrow A.

At the other end of the unit cell 12 in the longitudinal direction, a fuel gas supply passage 30a for supplying the fuel gas, and an oxygen-containing gas discharge passage 28b for discharging the oxygen-containing gas are provided. The fuel gas supply passage 30a and the oxygen-containing gas discharge passage 28b extend through the unit cell 12 in the direction indicated by the arrow A.

Normally, the air is used as the oxygen-containing gas, and the hydrogen gas is used as the fuel gas. Therefore, the flow rate of the oxygen-containing gas is larger than the flow rate of the fuel gas. Thus, the opening areas of the oxygen-containing gas supply passage 28a and the oxygen-containing gas discharge passage 28b are larger than the opening areas of the fuel gas supply passage 30a and the fuel gas discharge passage 30b. Since the fuel gas and the oxygen-containing gas are consumed, the opening area of the oxygen-containing gas discharge passage 28b is smaller than the opening area of the oxygen-containing gas supply passage 28a, and the opening area of the fuel gas discharge passage 30b is smaller than the opening area of the fuel gas supply passage 30a. That is, from the largest opening area, the size of the opening area is in the order of the oxygen-containing gas supply passage 28a, the oxygen-containing gas discharge passage 28b, the fuel gas supply passage 30a, and the fuel gas discharge passage 30b.

At an upper end of the unit cell 12, coolant supply passages 32a, 32a for supplying a coolant are provided, and at a lower end of the unit cell 12, coolant discharge passages 32b, 32b for discharging the coolant are provided.

The membrane electrode assembly 22 includes a cathode 36, an anode 38, and a solid polymer electrolyte membrane 34 interposed between the cathode 36 and the anode 38. The solid polymer electrolyte membrane 34 is formed by impregnating a thin membrane of perfluorosulfonic acid with water, for example.

Each of the cathode 36 and the anode 38 has a gas diffusion layer (not shown) such as a carbon paper, and an electrode catalyst layer (not shown) having platinum alloy supported on porous carbon particles. The carbon particles are deposited uniformly on the surface of the gas diffusion layer. The electrode catalyst layer of the cathode 36 and the electrode catalyst layer of the anode 38 are fixed to both surfaces of the solid polymer electrolyte membrane 34, respectively.

Figure 4:
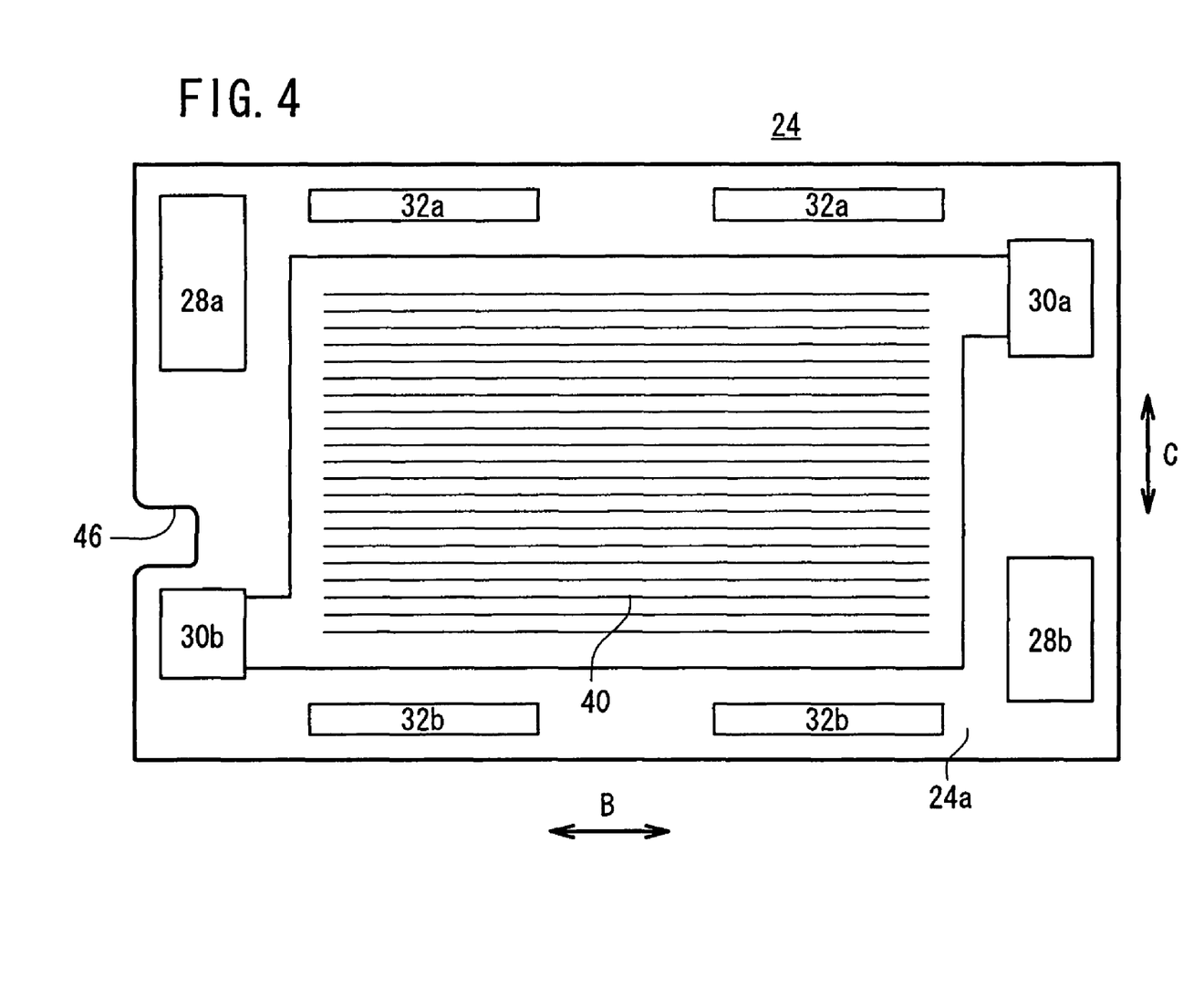
FIG. 4 is a front view showing a separator of the unit cell.

As shown in FIG. 4, the first metal separator 24 has a fuel gas flow field 40 on its surface 24a facing the membrane electrode assembly 22. The fuel gas flow field 40 is connected between the fuel gas supply passage 30a and the fuel gas discharge passage 30b. For example, the fuel gas flow field 40 comprises a plurality of grooves extending in the direction indicated by the arrow B. As shown in FIG. 3, the first metal separator 24 has a coolant flow field 42 on a surface 24b. The coolant flow field 42 is connected between the coolant supply passages 32a and the coolant discharge passages 32b. The coolant flow field 42 comprises a plurality of grooves extending in a direction indicated by an arrow C.

The second metal separator 26 has an oxygen-containing gas flow field 44 on its surface 26a facing the membrane electrode assembly 22. For example, the oxygen-containing gas flow field 44 comprises a plurality of grooves extending in the direction indicated by the arrow B. The oxygen-containing gas flow field 44 is connected between the oxygen-containing gas supply passage 28a and the oxygen-containing gas discharge passage 28b. The other surface 26b of the second metal separator 26 is stacked on the surface 24b of the adjacent first metal separator 24. When the first metal separator 24 and the second metal separator 26 are stacked together, the coolant flow field 42 is formed between the surface 24b of the first metal separator 24 and the surface 26b of the second metal separator 26.

The oxygen-containing gas supply passage 28a and the fuel gas discharge passage 30b having the different opening areas extend through at least one side of the outer region of the unit cell 12. A recess 46 is provided near the fuel gas discharge passage 30b having the smaller opening area. The recess 46 extends through the unit cell 12 in the direction indicated by the arrow A. For example, a cell voltage terminal 48 is accommodated in the recess 46 at the second metal separator 26.

The cell voltage terminal 48 is used for detecting the voltage generated in the membrane electrode assembly 22. The cell voltage terminal 48 is provided integrally with the second metal separator 26. As described later, the metal surface of the cell voltage terminal 48 is exposed to the outside. As shown in FIG. 1, cell voltage detectors 50 are connected to the unit cells 12 at intervals of a predetermined number of the cell voltage terminals 48. Each of the cell voltage detectors 50 has, e.g., a cell voltage monitor. The cell voltage detector 50 contacts the second metal separator 26 having the same polarity as the unit cell 12 for detecting the potential of the unit cell 12.

As shown in FIG. 3, a first seal member 52 is formed integrally on the surfaces 24a, 24b of the first metal separator 24 to cover (sandwich) the outer end of the first metal separator 24. A second seal member 54 is formed integrally on the surfaces 26a, 26b of the second metal separator 26 to cover (sandwich) the outer end of the second metal separator 26. The second seal member 54 is peeled off from the cell voltage terminal 48 such that the metal surface of the cell voltage terminal 48 is exposed to the outside.

As shown in FIGS. 1 and 2, plate shaped terminals 56a, 56b protrude from the ends of the terminal plates 16a, 16b in parallel with the surfaces of the terminal plates 16a, 16b, respectively. A load such as a motor for a vehicle is connected to the terminals 56a, 56b.

As shown in FIG. 1, at one end of the end plate 20a in the direction indicated by the arrow B, an oxygen-containing gas supply pipe 60a connected to the oxygen-containing gas supply passage 28a and a fuel gas discharge pipe 62b connected to the fuel gas discharge passage 30b are provided. At the other end of the end plate 20a in the direction indicated by the arrow B, a fuel gas supply pipe 62a connected to the fuel gas supply passage 30a and an oxygen-containing gas discharge pipe 60b connected to the oxygen-containing gas discharge passage 28b are provided.

At an upper end of the end plate 20a, a coolant supply pipe 64a connected to the coolant supply passages 32a is provided, and at a lower end of the end plate 20a, a coolant discharge pipe 64b connected to the coolant discharge passages 32b is provided.

Operation of the fuel cell stack 10 will be described below.

Firstly, as shown in FIG. 1, an oxygen-containing gas such as the air is supplied to the oxygen-containing gas supply pipe 60a toward the end plate 20a, and a fuel gas such as a hydrogen-containing gas is supplied to the fuel gas supply pipe 62a toward the end plate 20a. Further, a coolant such as pure water and an ethylene glycol is supplied to the coolant supply pipe 64a. Therefore, the oxygen-containing gas, the fuel gas, and the coolant are supplied to the stack body 14 formed by stacking a plurality of the unit cells 12 in the direction indicated by the arrow A.

As shown in FIG. 3, the oxygen-containing gas flows from the oxygen-containing gas supply passage 28a into the oxygen-containing gas flow field 44 of the second metal separator 26, and flows along the cathode 36 of the membrane electrode assembly 22 for inducing an electrochemical reaction at the cathode 36. The fuel gas flows from the fuel gas supply passage 30a into the fuel gas flow field 40 of the first metal separator 24, and flows along the anode 38 of the membrane electrode assembly 22 for inducing an electrochemical reaction at the anode 38.

Thus, in each of the membrane electrode assemblies 22, the oxygen-containing gas supplied to the cathode 36, and the fuel gas supplied to the anode 38 are consumed in the electrochemical reactions at catalyst layers of the cathode 36 and the anode 38 for generating electricity.

After the oxygen-containing gas is consumed at the cathode 36, the oxygen-containing gas flows through the oxygen-containing gas discharge passage 28b. Then, the oxygen-containing gas is discharged to the outside from the oxygen-containing gas discharge pipe 60b of the end plate 20a. Likewise, after the fuel gas is consumed at the anode 38, the fuel gas flows through the fuel gas discharge passage 30b. Then, the fuel gas is discharged to the outside from the fuel gas discharge pipe 62b of the end plate 20a.

Further, the coolant flows from the coolant supply passages 32a into the coolant flow field 42 between the first and second metal separators 24, 26, and then, flows in the direction indicated by the arrow C. After the coolant cools the membrane electrode assembly 22, the coolant flows through the coolant discharge passages 32b. The coolant is discharged from the coolant discharge pipe 64b of the end plate 20a.

In the first embodiment, the recess 46 is provided on one side of the second metal separator 26, and the cell voltage terminal 48 is accommodated in the recess 46. Therefore, the cell voltage terminal 48 does not protrude outwardly from the one side of the second metal separator 26. Thus, the space required for installing the cell voltage detector 50 connected to a predetermined number of the cell voltage terminals 48 is not expanded outwardly from the unit cells 12, and the overall size of the fuel cell stack 10 is reduced effectively.

Further, the recess 46 is provided near the fuel gas discharge passage 30b having the small opening area in comparison with the oxygen-containing gas supply passage 28a. Therefore, the space for the recess 46 is available without reducing the opening area of the oxygen-containing gas supply passage 28a. Thus, it is possible to maintain the desired electrode surface area, and to reduce the pressure loss in the oxygen-containing gas supply passage 28a. Accordingly, the power generation can be carried out efficiently.

Further, the opening area of the fuel gas discharge passage 30b is the smallest among the oxygen-containing gas supply passage 28a, the oxygen-containing gas discharge passage 28b, the fuel gas supply passage 30a, and the fuel gas discharge passage 30b. Therefore, the space for the recess 46 can be provided easily and reliably.

Figure 5:
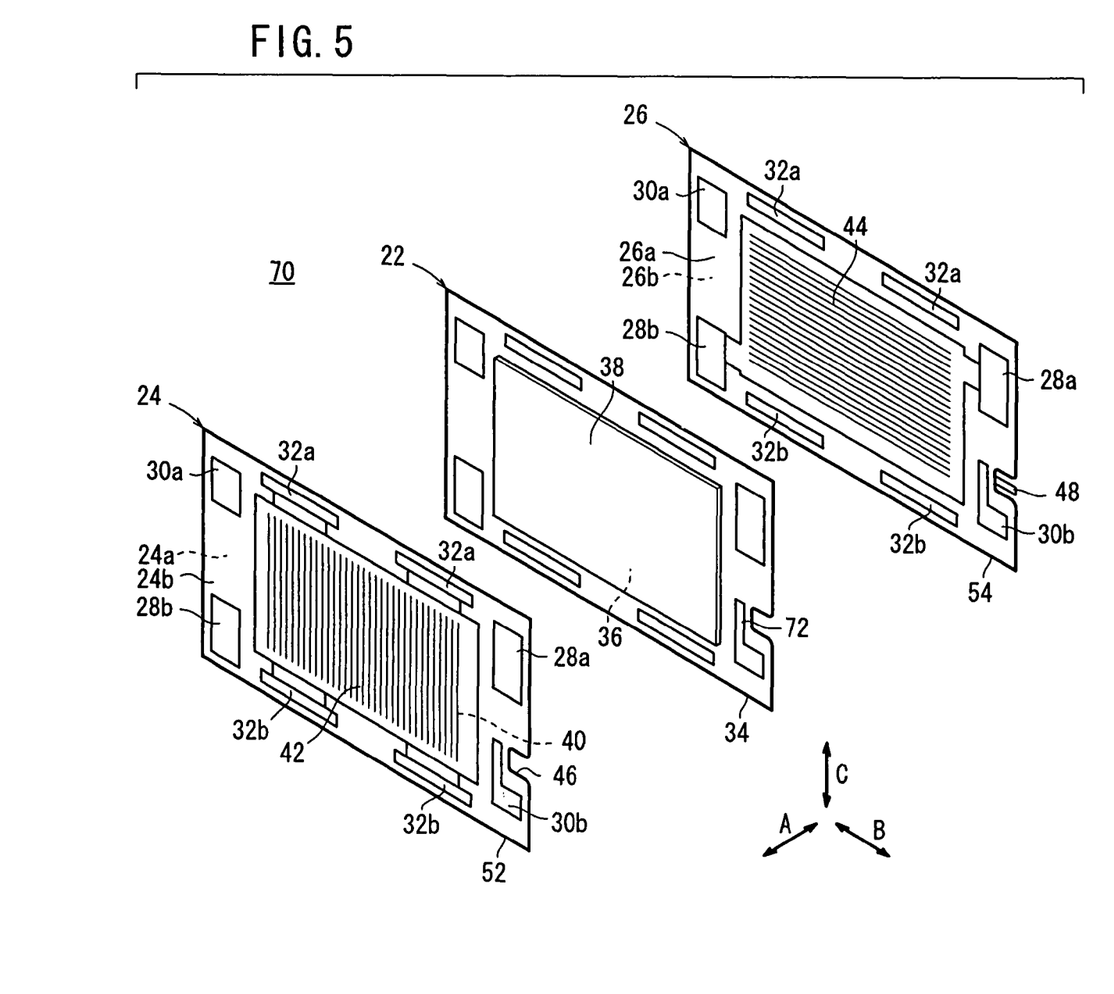
FIG. 5 is an exploded perspective view showing a unit cell of a fuel cell according to a second embodiment of the present invention.

FIG. 5 is an exploded perspective view of a unit cell 70 of a fuel cell according to a second embodiment of the present invention. The constituent elements that are identical to those of the unit cell 12 of the fuel cell stack 10 according to the first embodiment are labeled with the same reference numeral, and description thereof will be omitted. Likewise, in a third embodiment described later, the constituent elements that are identical to those of the unit cell 12 according to the first embodiment are labeled with the same reference numeral, and description thereof will be omitted.

In the second embodiment, the fuel gas discharge passage 30b has a narrow portion 72, and a recess 46 is provided at a position corresponding to the narrow portion 72. A cell voltage terminal 48 is accommodated in the recess 46 of the second metal separator 26 (or the first metal separator 24).

In the second embodiment, the shape of the fuel gas discharge passage 30b having the smallest opening area is changed to have the narrow portion 72. In the structure, the same advantages as in the case of the first embodiment can be obtained. For example, the space for the recess 46 can be provided even more easily.

Figure 6:
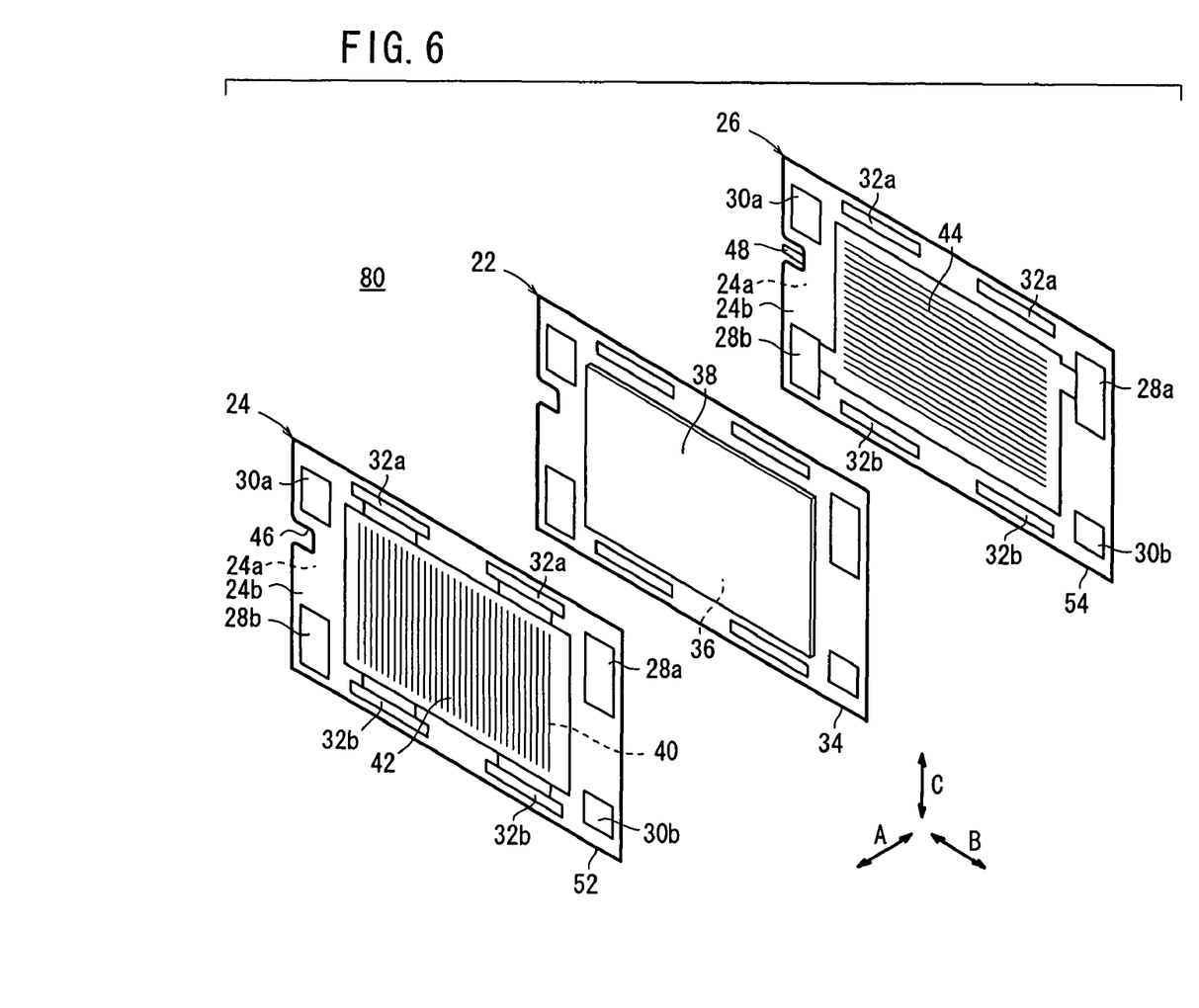
FIG. 6 is an exploded perspective view showing a unit cell of a fuel cell according to a third embodiment of the present invention.

FIG. 6 is an exploded perspective view showing a unit cell 80 of a fuel cell according to a third embodiment of the present invention.

In the third embodiment, a recess 46 is provided on the side opposite to side in the cases of the first and second embodiments. That is, the recess 46 is provided near the fuel gas supply passage 30a having the small opening area in comparison with the oxygen-containing gas discharge passage 28b.

Therefore, in the third embodiment, the same advantages as in the cases of the first and second embodiments can be obtained. For example, the space for the recess 46 is available. It is possible to maintain the desired electrode surface area, and to reduce the pressure loss in the oxygen-containing gas discharge passage 28*b*.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking unit cells, said unit cells each comprising an electrolyte electrode assembly and metal separators stacked in a stacking direction, said electrolyte electrode assembly including a pair of electrodes, and an electrolyte interposed between said electrodes, fluid passages extending through said fuel cell in the stacking direction such that fluids including at least one of a coolant and reactant gases flow through said fluid passages, wherein
    a first fluid passage has a first opening area extending through at least one side of said separators, and a second fluid passage has a second opening area extending through at least the same side of said separators as the first fluid passage, the first opening area being smaller than the second opening area; and
    a recess is formed immediately adjacent to the first opening area and extends completely through the separators, the recess extending from one side of one of the separators of said unit cell into the separator and at least a portion of the recess being located between the first opening area and the second opening area; and
    a cell voltage terminal is provided integrally with the separator in said recess, the cell voltage terminal extending from an interior side of the recess towards an exterior side of the recess such that the cell voltage terminal does not extend outwardly beyond the one side of the separator.

2. A fuel cell according to claim 1, wherein said first fluid passage is a fuel gas discharge passage.

3. A fuel cell according to claim 1, wherein said first fluid passage is a fuel gas supply passage.

4. A fuel cell according to claim 1, wherein said first fluid passage has a first opening portion and a second opening portion, said first opening portion being narrower than the second opening portion, and said recess is provided at a position adjacent to said first opening portion.

5. A fuel cell according to claim 1, wherein an oxygen-containing gas supply passage and a fuel gas discharge passage are provided at one longitudinal end of said separator;
    a fuel gas supply passage and an oxygen-containing gas discharge passage are provided at the other longitudinal end of said separator; and
    a coolant supply passage and a coolant discharge passage are provided at opposite lateral ends of said separator.

\* \* \* \* \*